United States Patent [19]

Cline

[11] 3,740,721

[45] June 19, 1973

[54] DATA CONVERSION AND RECORDING APPARATUS

[76] Inventor: George A. Cline, 716 B Old San Francisco Road, Sunnyvale, Calif.

[22] Filed: July 20, 1971

[21] Appl. No.: 164,418

Related U.S. Application Data

[63] Continuation of Ser. No. 883,842, Dec. 10, 1969, abandoned.

[52] U.S. Cl. ........... 340/172.5, 101/93 C, 235/154, 340/347 P

[51] Int. Cl. ............................................ G06f 1/00

[58] Field of Search ................ 178/23 R, 23 A, 26; 235/154; 101/93 C, 93 C X; 340/347 P, 172.5, 347 P; 179/15 A

[56] References Cited

UNITED STATES PATENTS

| | | | |
|---|---|---|---|
| 3,232,404 | 2/1966 | Jones, Jr. | 101/93 C X |
| 2,869,964 | 1/1959 | Mitchell et al. | 179/15 A X |
| 3,418,653 | 12/1968 | Robinson | 340/347 P |
| 2,734,188 | 2/1956 | Jacobs | 340/347 P X |
| 3,242,469 | 3/1966 | Anderson et al. | 101/93 C X |
| 3,399,753 | 9/1968 | Revelle | 101/93 C X |
| 3,193,802 | 7/1965 | Deerfield | 101/93 C X |

*Primary Examiner*—Charles D. Miller
*Attorney*—Alan H. MacPherson

[57] ABSTRACT

A data conversion and recording apparatus is provided wherein data in either decimal or binary form may be received and converted into a selected code before being recorded. An encoding means in the form of a disc, drum or tape is used to sequentially generate all of the characters in a given code for each input signal, and a coincidence means is provided for selecting from the encoding means the code character which corresponds to the particular input signal. The detection of a coincidence between the code character appearing on the encoding means and the signal applied to one of the input terminals causes that code character to be stored and be subsequentially recorded on a recording means. The encoding means is of a form which can be readily interchanged so as to enable a given input signal to be selectively encoded in any of a plurality of codes.

13 Claims, 5 Drawing Figures

INVENTOR
GEORGE A. CLINE
BY

INVENTOR.
GEORGE A. CLINE
BY Harvey J. Hawbecker
ATTORNEY

DATA CONVERSION AND RECORDING APPARATUS

This application is a continuation of Ser. No. 883,842 filed Dec. 10, 1969 now abandoned.

BACKGROUND OF THE INVENTION

The present invention relates generally to a data recording apparatus and, more particularly, to a novel data conversion and recording system for accepting digital data in decimal or binary coded decimal (BCD) form, and converting it into any one of a plurality of selectable codes and then producing a permanent record of the encoded data.

Most digital instruments, such as analog-to-digital converters, frequency counters and electronic measurement apparatus that have a read-out display in numerical form, provide an electrical output of some type which represents the digital number otherwise displayed. Normally, such data is in binary coded decimal form, although it may be provided in straight digital form. Where computers are used to evaluate such data, or other machines are to be run in response to the data on an off-line basis, it is necessary that some means be provided for recording the output signals. And since most machine languages differ significantly from the typical signals provided by the monitored equipment, means must be provided for converting the input data into a form which can be recorded for later machine use or evaluation.

Although data conversion and recording devices have been used for many years, most devices of this type have suffered from disadvantages of cost and complexity which primarily stem from the requirement that all of the several components of the system be synchronized. For example, most systems presently used require the use of elaborate electronic circuitry in order to perform the required code conversion from a given input signal into a particular machine language which can be recorded for subsequent use.

Another disadvantage of certain prior art apparatus is that because of the need for complete system synchronization, an AC power supply is required for driving certain synchronous machinery involved in the system. This, of course, means that apparatus for monitoring remote field measuring devices becomes quite expensive since some type of oscillator must be provided to act as a synchronizing reference.

Another disadvantage of the prior art system is that because of the electronic complexity of the device, interchangeability of encoding components involves a complex process which may require replacement of a large part or even the entire apparatus when a code change is required. This may practically limit the utility of a given device and require the use of several different types of machines.

OBJECTS OF THE PRESENT INVENTION

It is therefore a primary object of the present invention to provide a simplified data conversion and recording system which is capable of receiving input data in one form and converting it into a selected machine language which is recorded for subsequent use.

Another object of the present invention is to provide a data conversion and recording system wherein a code conversion component can be easily interchanged to modify the type of output code produced thereby without requiring a modification of any of the electronic circuitry of the system.

Still another object of the present invention is to provide a novel data recording apparatus which includes a mechanically driven encoding means which, in addition to providing a code conversion function, also provide a means for synchronizing the entire system.

SUMMARY OF THE INVENTION

In accordance with the present invention, a data conversion and recording apparatus is provided wherein data in either decimal or binary form may be received and converted into a selected code before being recorded. An encoding disc, drum, tape, or other means is used to scan through an entire code for each input character and a coincidence means is provided for selecting from the encoding means the code character which corresponds to a particular input signal. A common motive power source is provided for the encoding means and the recording means so that they are necessarily always in synchronism and each code character of the encoding means includes a synchronizing component for generating a signal which serves to cause each of a plurality of input signal lines to be sequentially addressed. A predetermined dead time is provided in each encoding cycle so as to enable the recording operation to be performed during this period.

A principal advantage of the present invention is that since the operation of the entire device is keyed to the encoding means no elaborate synchronizing system is required. Furthermore, because of this feature and the fact that the encoding means includes a mechanically driven character generating element which is driven completely independent of the particular type of code appearing thereon, the encoding element can be easily interchanged with any of a plurality of differently encoded elements thus enabling a selection to be made of the type code to be used. This means that a single device made in accordance with the present invention can be used to provide recording data for use by any number of different data processing or utilizing apparatus by simply selecting and inserting an appropriate encoding element into the device.

Still other advantages of the present invention will become apparent to those skilled in the art after having read the following detailed description of the preferred embodiments which are illustrated in the several figures of the drawing.

IN THE DRAWING

DETAILED DESCRIPTION OF THE PREFERRED EMBODIMENT

Figure 1:
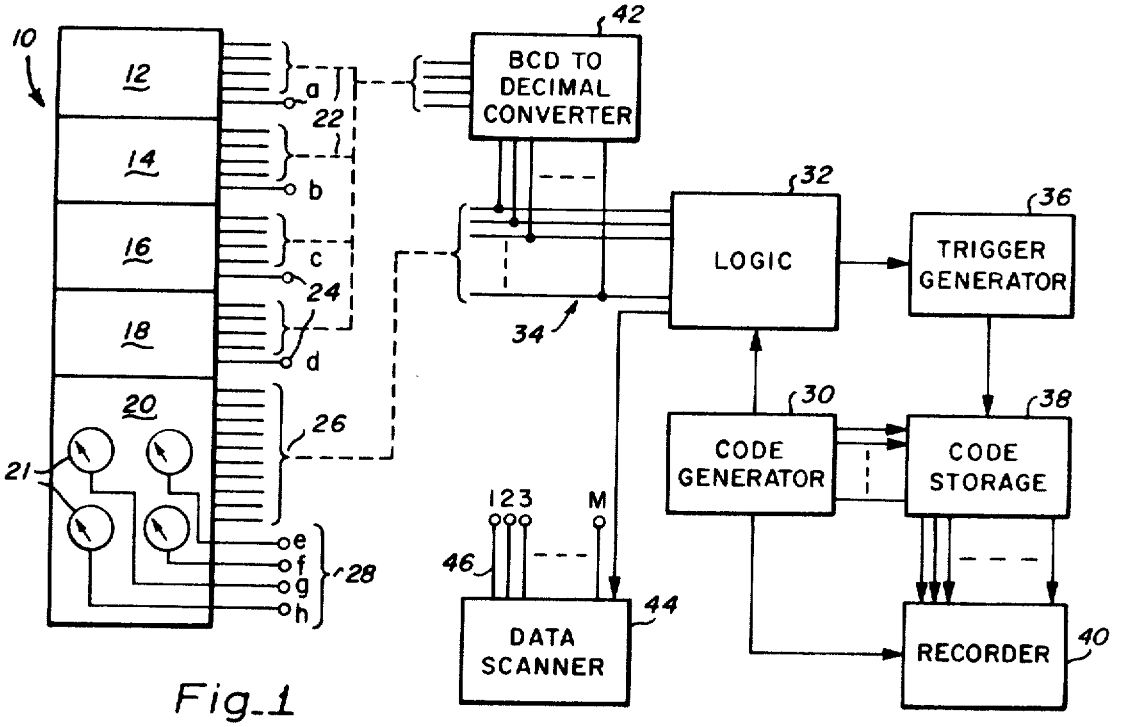
FIG. 1 is a functional block diagram of a generalized data conversion and recording system in accordance with the present invention.

Referring now to FIG. 1 of the drawing, there is shown at 10 a bank of instruments to be periodically monitored and the outputs thereof to be recorded for subsequent use or evaluation. The instruments 12 through 18 provide a BCD output on the corresponding four output lines 22 when their corresponding address lines 24 are interrogated. The switch bank 20 may, for example, include four switches 21 each having electrical outputs in decimal form which are output on the lines 26 when individually interrogated by an input applied to the corresponding address lines 28. In other words, by supplying address pulses to any of the address lines 24 or 28, the instruments 12 through 20 can be monitored, the instruments 12 through 18 providing BCD outputs, and the switches 21 providing decimal outputs.

Although many prior art devices enable such instruments to be monitored and the output signals to be recorded, one of the primary disadvantages of the prior art systems is that it is difficult or expensive to change the form of the code used to form the record of the data received. And since the resultant recorded data is typically fed into a computer or other machine, it is of great advantage to have a code conversion and recording system with interchangeable encoding components which can be substituted without requiring that other changes be made to the recording system.

The novel data conversion system of the present invention includes a code generator 30 having an encoded means which can be readily interchanged to produce any desired type of output code in response to a given data input. The encoding element of the generator 30 is of a type which sequentially produces n output signals followed by a predetermined period of dead time and then repeats the sequence. Each character in the code includes a timing component so that as each code is sequentially scanned, a synchronizing signal is generated. These synchronizing signals are used to cause a logic means 32 to sequentially interrogate a plurality of digital input lines 34 each of which corresponds to one of the code characters generated by the code generator 30.

Thus, as the code generator 30 sequentially generates the n code characters, the logic means 32 is simultaneously caused to interrogate each of the n input lines 34. If one of the lines 34 should have an input signal applied thereto, a signal will be provided to a trigger generator 36 which causes the code storage means 38, which is responsive to the code generator 30, to retain the code character provided by generator 30 which corresponds to the input line 34 that has the input applied thereto. Then, during the time that the code generator completes its serial pass through its encoding cycle the storage means 38 causes the selected code to be input to the recorder 40.

The recorder 40 may, for example, be actuated by a signal from code generator 30 which is produced following each scan through the n codes. Since much of the data to be recorded by such a system is initially obtained in BCD form, a BCD to decimal converter means 42 is provided for converting the BCD data on input lines 22 into decimal form for application to the logic input lines 34. However, where the raw data is already in decimal form, such as is available at the lines 26, the data can be fed directly into the logic means 32.

The apparatus is also capable of sequentially interrogating a number of data sources and recording the outputs obtained therefrom. This is accomplished by means of a data scanner means 44 having m interrogating lines 46 each of which might, for example, be used to interrogate one digit in the output of any of the instruments in the bank 10. For example, data scanner line 1 might be coupled to the interrogating terminal *a* of instrument 12, line 2 might be coupled to line *b* of instrument 14, line 3 to line *c* of instrument 16, etc. In order to synchronize the scanner 44 with the rest of the system, an output signal is generated by logic means 32 following each interrogation of the last of the lines 34 and this signal is used to step the interrogation from lines 1 to 2 to 3 . . . to *m*. Accordingly, the entire system of the present invention is functionally synchronized to the operation of the code generator 30 and no elaborate clocking means is required.

In operation then, once the BCD inputs are coupled into the converter 42, the decimal inputs are coupled into the digital input lines 34 of logic means 32, and the interrogating lines 46 of scanner 44 are properly connected to the interrogation terminals *a*, *b*, *c* . . . of the instruments 10, the outputs generated by the instrument 10 can be recorded on the recorder 40 in accordance with the particular types of output code generated by the generator 30. However, since the operation of the system is entirely independent of the particular code being utilized, the recorded output can be changed at will by a simple substitution of the encoding elements of generator 30.

Figures 2, 4:
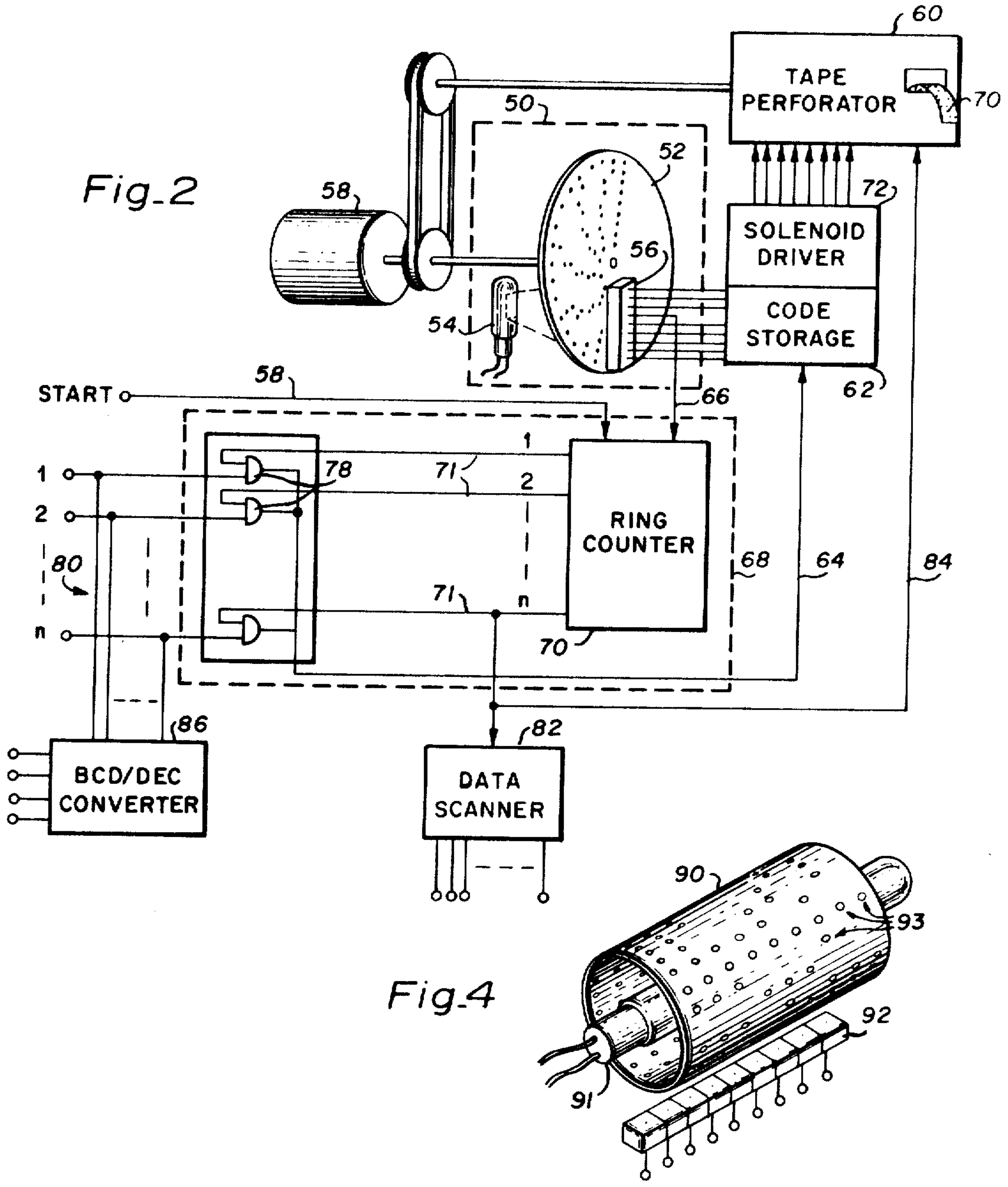
FIG. 2 is a functional block diagram of a preferred embodiment of the present invention.
FIG. 4 is an illustration of a drum type encoding means in accordance with the present invention.

Turning now to FIG. 2 of the drawing, a preferred embodiment of the present invention will be described. In this embodiment, the code generator 50 is comprised of an apertured disc 52 having n code characters in the form of radial arrays of holes disposed over approximtaely 180° of the disc, a light source 54 and a stacked array 56 of light sensing elements suitable for detecting each of the apertures in the disc 52.

In the illustrated embodiment, the sensor 56 is comprised of 9 photocells stacked one upon the other such that each is responsive to light allowed to pass from the source 54 through apertures at a given radial distance from the center of the disc 52. The disc 52 is driven by a motor means 58 which may also serve as the drive source for the recording means 60 which, in this case, is illustrated as being a tape perforator. The recorder, however, can be of any suitable type. It will be noted that with a one-to-one ratio the perforator 60 can be made to record one character for each revolution of the disc 52 and is thus in full synchronization therewith.

The upper three and lower five output lines from the photocell array 56 are coupled into a code storage means 62 which, although responsive to each of the codes on the disc 52, will only store that code which is input simultaneously with a store signal introduced on line 64. Each character array on the disc 52 also has an indexing hole in the fourth position from the center that serves as the synchronizing signal generating means which is output on line 66. The output on line 66 is fed into the logic means 68 to drive the ring counter 70 so as to cause an output signal to be serially produced on each of the output lines 71.

During the noncoded portion of the disc cycle, the solenoid driver 72 is actuated by the code stored in storage means 62 and following this actuation, but before the end of that particular revolution of the disc the perforator 60 is caused to punch holes in the tape 70 which correspond to the code introduced into driver 72 from the disc.

The output lines 71 are coupled to the AND gates 78 each of which includes a second input line leading to the n digital input terminals 80. Since each of the radial arrays of holes in the disc 52 includes an indexing hole, each of which corresponds to one of the n input lines, one of the lines 71 of the counter 70 is energized during the time that an array of disc holes passes in front of detector 56 and, as a result, should any of the terminals of lines 80 have an input signal applied thereto the counter output will cause the corresponding AND gate to open and produce a pulse on line 64 which causes that particular character to be stored in storage means 62 as previously described. The nth output of the counter 70 is used to cause the data scanner 82 to step to the next instrument line to be interrogated and may also be fed to the perforated 60 via line 84 to actuate the tape advance mechanism thereof.

Since some of the data input to the system is in BCD form, a BCD to decimal converter 86 is also provided as was described in the circuit of FIG. 1. The decimal outputs of the converter 86 are coupled directly to the decimal terminals 80 so that either a BCD or a decimal input can be input into the system.

Figure 3:
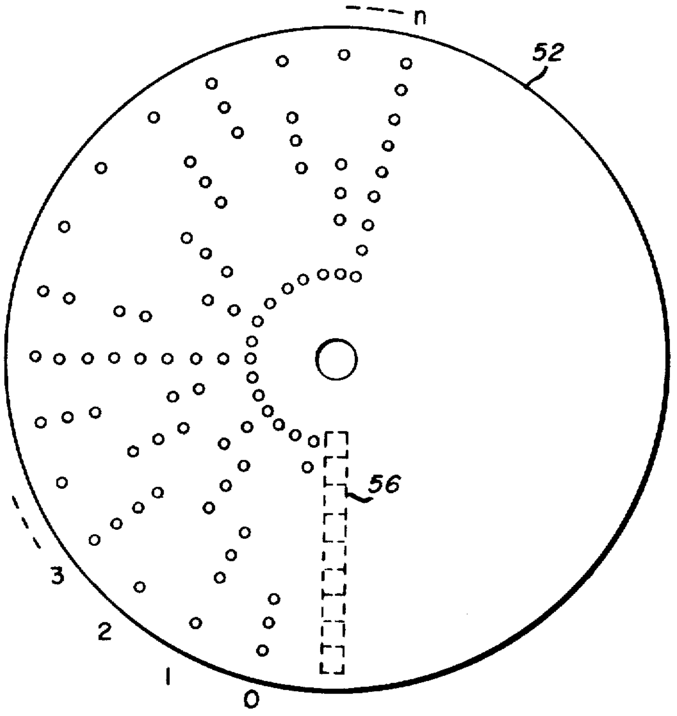
FIG. 3 is an illustration of an encoding disc in accordance with the present invention.

Turning now to FIG. 3 of the drawing, the disc 52 is more clearly illustrated. The disc itself is constructed of a suitable opaque material and has n radial arrays of light conducting apertures formed therein with each array coded in accordance with a particular encoding scheme. As an example, the first array "0" might correspond to the number 0, the second radial might correspond to the number 1, the third radial 2, the fourth radial 3, etc., up through 9 and then the remaining (*n*—10) arrays might correspond to any other character which need be recorded. The angular spacing between each of the respective arrays of holes may be more or less arbitrarily chosen but preferably should be large enough to accommodate good resolution of the detector 56 but be small enough to allow all of the character arrays to be positioned in 180° or less of the disc.

In operation, the photoconductor array would be positioned as illustrated by the dashed lines 56, for example, so that each of the photocells of the array would scan one of the nine positions in each of the *n* aperture arrays. Although nine aperture positions are included in each of the radial character arrays, the fourth position from the center of the disc contains no coded information but is always open to provide an indexing aperture. Note that these index holes can be placed in other locations on the disk, such as in the first position from the center as shown in FIG. 3. These holes are the ones which are used to provide the signals for driving the ring counter 70 as illustrated in FIG. 2. The other eight hole sites in each array may be used to provide any suitable combinations of holes corresponding to any coded set of characters to be recorded. The fact that a disc providing for an eight channel code arrangement is illustrated is only by way of example and any larger or smaller code could just as well be utilized.

It will thus be readily seen that since the photocell array 56 is only sensitive to one radial array of apertures at a time and the apparatus as a whole does not depend on the particular number of character radials provided on the disc, within the limits of the resolution of the detector 56, of course, any number *n* of coded characters can be provided thereon. Consequently, a separate disc can be utilized for each encoding scheme and such discs may be easily interchanged when a code change is desired. Furthermore, since the operation of the apparatus is independent of the number of characters included in any disc 52, so long as the disc includes at least as many indexing holes as there are input lines, the hole designations for the characters of any code can follow any encoding technique.

In FIG. 4 of the drawing, an alternate embodiment of an encoding element is illustrated which may take the form of an apertured cylinder 90. The cylinder 90 has longitudinal arrays of holes passing therethrough and is positioned about a light source 91 so as to cause light passing through the apparatus to be detected by an array of photosensitive detectors 92 positioned so as to read the apertures in a manner similar to that accomplished using the disc of FIG. 3. In the alternative, the cylinder 90 may be formed of a magnetic recording material having the desired coded characters 93 magnetically provided in the surface thereof and in this case the detector 92 would be provided with magnetic playback heads which would detect the encoded characters as the cylinder 92 was rotated. Moreover, the code indicia 93 could be formed of metallic particles raised to some potential in which case the detectors 92 could be metallic electrodes for electrostatically reading the encoded characters. It is, of course, to be understood that the disc 52 of FIG. 3 could also be of the magnetic or electrostatic type as opposed to the photoelectric embodiment illustrated.

Figure 5:
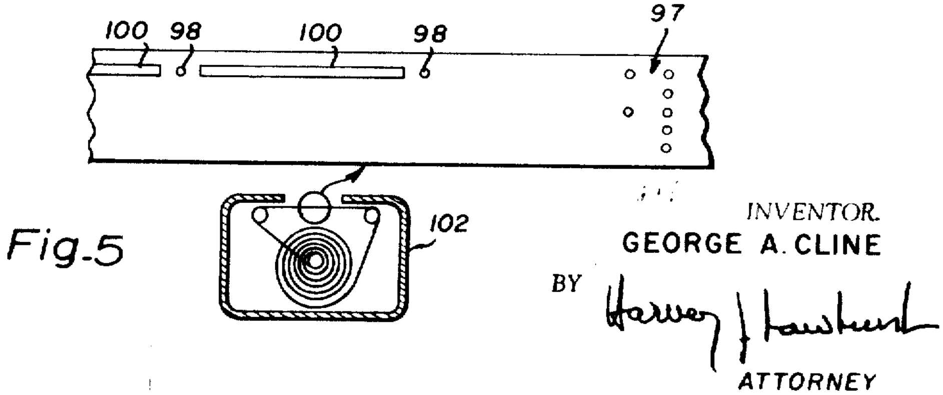
FIG. 5 is an illustration of a tape cartridge encoding means in accordance with the present invention.

Still another encoding technique suitable for use with the present invention is illustrated in FIG. 5 and includes a magnetic tape 96 which may have, for example, *x* channels of information magnetically provided in columns thereon in which case *x* magnetic playback heads would be required to read-out the code characters 97. In the alternative, the code characters could be sequentially provided on the tape so that a single recording head could be utilized for read-out scanning. In such case, a sync signal 98 might be provided preceding each code character position 100 so that both sync and character data would be obtained by the signal magnetic playback head. An apertured tape could likewise be used in combination with a photoelectric read-out means similar to that of FIG. 2. Where the tape embodiment is used, the tape might, for example, be made endless and be housed in a center feed cartridge or cassette 102 of the type commonly used in many magnetic recording and playback applications today.

Although only a few of the many possible variations of the present invention have been specifically pointed above, it will be readily understood that the present invention offers many advantages over the more complex apparatus of the prior art. For example, since the entire system is synchronized with any by the encoding element itself, whether it be a disc, drum magnetic tape or whatever, the speed of the motor 58 illustrated in FIG. 2 is not critical and recording can commence at the instant the motor 58 is actuated rather than having to wait until it attains synchronus speed. Moreover, the present invention readily lends itself to use in remote areas where electrical power is only available by way of battery or electrical generator systems since it requires no A/C energy to provide synchronism. Furthermore, because of its non-dependence on the stability of an AC source, the system is readily applicable to vehicular applications in which certain instruments are to be monitored during the course of vehicular travel.

As an additional alternative, the disc or other encoding means could be modified and incorporated into the recording apparatus for directly controlling the recording instrumentation. For example, an apertured disc could be used in a tape perforator as the means for selecting which punch heads are to strike the tape, i.e., the punch-heads might be caused to pass through the disc apertures.

I contemplate that after having read the above disclosure, many other modifications of the present invention will become apparent to those skilled in the art. It is therefore to be understood that this description is merely representative and is in no way intended to be limiting. Accordingly, I intend that the appended claims be interpreted as covering all such modifications as fall within the true spirit and scope of the invention.

What is claimed is:

1. A data conversion and recording system comprising:

a plurality of input terminals each corresponding to one type of output character to be recorded by said system;

a mechanically driven encoding means which during a first portion of one encoding cycle serially generates a plurality of code characters, the number of said code characters being at least equal to the number of said input terminals, and which during a second portion of the same encoding cycle generates no code characters;

interrogating means responsive to said encoding means for successively interrogating said input terminals one each time a corresponding code character is generated by said encoding means and for producing an output signal each time the corrresponding one of the terminals interrogated has an input signal applied thereto;

code storage means responsive to said encoding means and said interrogating means, said code storage means being caused to store the code character being generated by said encoding means at the time said output signal is produced by said interrogating means; and recorder means for recording said code character stored in said code storage means, said recording to occur during the second portion of said encoding cycle.

2. A data conversion and recording system as recited in claim 1 including a data scanning means responsive to said interrogating means for sequentially coupling a different signal source to said input terminals subsequent to each time the last of said input terminals is interrogated.

3. A data conversion and recording system as recited in claim 2 wherein said code generating means includes an apertured disc means having a plurality of radial arrays of apertures therein with each array corresponding to a specific code character, said generator means also including a light source disposed on one side of said disc means and a light sensing means disposed on the other side thereof so that light passing through a given array causes a unique output signal to be generated by said code generating means.

4. A data conversion and recording system as recited in claim 3 wherein said radial arrays are positioned over approximately 180° of the surface area of said disc means.

5. A data conversion and recording system as recited in claim 4 wherein each of said arrays contain an indexing aperture which causes an indexing signal to be generated by said generating means each time one of said arrays causes an output signal to be generated by said generating means.

6. A data conversion and recording system as recited in claim 5 wherein said indexing signals cause said logic means to serially interrogate each of said input terminals.

7. A data conversion and recording means as recited in claim 6 wherein said recording means is a tape perforator means having an actuating mechanism which is driven by the same motive power source that causes said disc means to be rotated.

8. A data conversion and recording system as recited in claim 2 wherein said code generating means includes a cylindrical encoding means having a plurality of discrete encoding characters disposed about the surface thereof and a detecting means is provided adjacent thereto for detecting said characters as said cylindrical means is caused to rotate relative thereto.

9. A data conversion and recording apparatus as recited in claim 8 wherein said cylindrical means has a plurality of apertures passing through the cylindrical surface thereof, said apertures being uniquely arrayed so that light caused to pass through certain ones of said apertures is caused to simultaneously impinge upon an array of light sensitive detecting means which generate electrical signals corresponding to said encoding characters.

10. A data conversion and recording system as recited in claim 8 wherein said encoding characters are formed by a plurality of metallic particles arrayed over the surface of said cylindrical means, said metallic particles being raised to a predetermined potential and being arrayed over the surface of said cylindrical means in a predetermined manner to form a plurality of discrete indicia which can be electrostatically scanned by an electrostatic scanning means disposed proximate said cylindrical means.

11. A data conversion and recording system as recited in claim 2 wherein said code generating means includes a tape cartridge means having an endless loop of tape disposed therein, said tape having a plurality of code characters serially impressed thereon which may be detected by a suitable read-out means.

12. A data conversion and recording system as recited in claim 11 wherein said tape has magnetic properties and said code characters are magnetically impressed thereupon.

13. A data conversion and recording system as recited in claim 11 wherein said tape is of an opaque material and said code characters are in the form of a plurality of uniquely arrayed apertures in said tape means.

* * * * *